US008498854B2

(12) United States Patent
Birch et al.

(10) Patent No.: US 8,498,854 B2
(45) Date of Patent: *Jul. 30, 2013

(54) ENABLING END-TO-END TESTING OF APPLICATIONS ACROSS NETWORKS

(75) Inventors: Oliver Birch, Annapolis, MD (US); Can Paul Boyacigiller, Annapolis, MD (US); Christopher Charles Dacombe, Ellicott City, MD (US); Sreenivasa Rao Pamidala, Crofton, MD (US); Zhiljian Pan, Clarksville, MD (US); Bouna Sall, Bowie, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,174

(22) Filed: May 15, 2012

(65) Prior Publication Data

US 2012/0226487 A1 Sep. 6, 2012

Related U.S. Application Data

(63) Continuation of application No. 12/499,194, filed on Jul. 8, 2009, now Pat. No. 8,275,586.

(51) Int. Cl.
*G06F 11/2692* (2006.01)

(52) U.S. Cl.
USPC .................................. 703/13; 703/2; 717/113

(58) Field of Classification Search
USPC ............. 703/2, 5, 13; 717/113, 139; 713/201; 370/392
See application file for complete search history.

(56) References Cited

U.S. PATENT DOCUMENTS

| | | | | |
|---|---|---|---|---|
| 6,708,141 | B1 * | 3/2004 | Schaff et al. | 703/2 |
| 6,993,747 | B1 * | 1/2006 | Friedman | 717/124 |
| 8,275,586 | B2 * | 9/2012 | Birch et al. | 703/2 |
| 2002/0199096 | A1 * | 12/2002 | Wenocur et al. | 713/153 |
| 2003/0009694 | A1 * | 1/2003 | Wenocur et al. | 713/201 |
| 2003/0041110 | A1 * | 2/2003 | Wenocur et al. | 709/206 |
| 2005/0246712 | A1 * | 11/2005 | Ferris | 719/310 |
| 2006/0058976 | A1 * | 3/2006 | Ferris | 702/123 |
| 2007/0208442 | A1 * | 9/2007 | Perrone | 700/95 |
| 2008/0159506 | A1 * | 7/2008 | Raheja | 379/201.12 |
| 2011/0161063 | A1 * | 6/2011 | Pye | 703/13 |
| 2011/0185342 | A1 * | 7/2011 | Argue et al. | 717/113 |

* cited by examiner

*Primary Examiner* — Thai Phan
(74) *Attorney, Agent, or Firm* — Cuenot, Forsythe & Kim, LLC

(57) ABSTRACT

End-to-end testing of applications across networks is enabled. To test the application and the infrastructure subsystems, an application server connected to the network contains an application under test. A response simulator is connected to the other end of the network. A test module is accessible to the application and to the simulator and contains a test message to be transmitted to the simulator, and an expected response message from the simulator. The application transmits each test message and compares a response message from the simulator to an expected response message. The simulator obtains the response to each test message from the test module.

12 Claims, 5 Drawing Sheets

ENABLING END-TO-END TESTING OF APPLICATIONS ACROSS NETWORKS

CROSS-REFERENCE TO RELATED APPLICATIONS

This application is a Continuation of U.S. application Ser. No. 12/499,194, filed on Jul. 8, 2009.

BACKGROUND

The present disclosure is related to testing of network and telecommunication protocols, and more particularly, with the end-to-end testing of applications that communicate over networks, including simple networks using a single protocol and converged networks that involve multiple protocols.

An application server, in an n-tier architecture, is a server that hosts an API to expose business logic and business processes for use by third-party applications. Application servers are based on a variety of platforms such as Microsoft®.NET and Java™ based platforms. Microsoft is a registered trademark of Microsoft Inc. in the United State, other countries or both and Java is a trademark of Sun Microsystems in the United States, other countries or both. An application server is typically executed on a computer server and executes one or more applications. An application server provides data and code integrity; centralized configuration; improves security and performance; and a lower total cost of ownership. The web applications running on the application server may need to be tested.

BRIEF SUMMARY

According to an illustrative embodiment, there is disclosed a system, method and computer program product for enabling end-to-end testing of applications across networks. To test the application and the infrastructure subsystems, an application server connected to the network will contain the application. A response simulator is connected to the other end of the network. A test module is accessible to the application and to the simulator and contains a test message to be transmitted to the simulator, and an expected response message from the simulator corresponding to each test message. The application under test is controlled to transmit each test message and to compare a corresponding response message from the simulator to an expected response message. The simulator obtains the response to each test message from the test module. A test module is identified by a test module identifier that is transmitted to the simulator in a private data portion of a transmitted test message.

DETAILED DESCRIPTION

Figure 1:
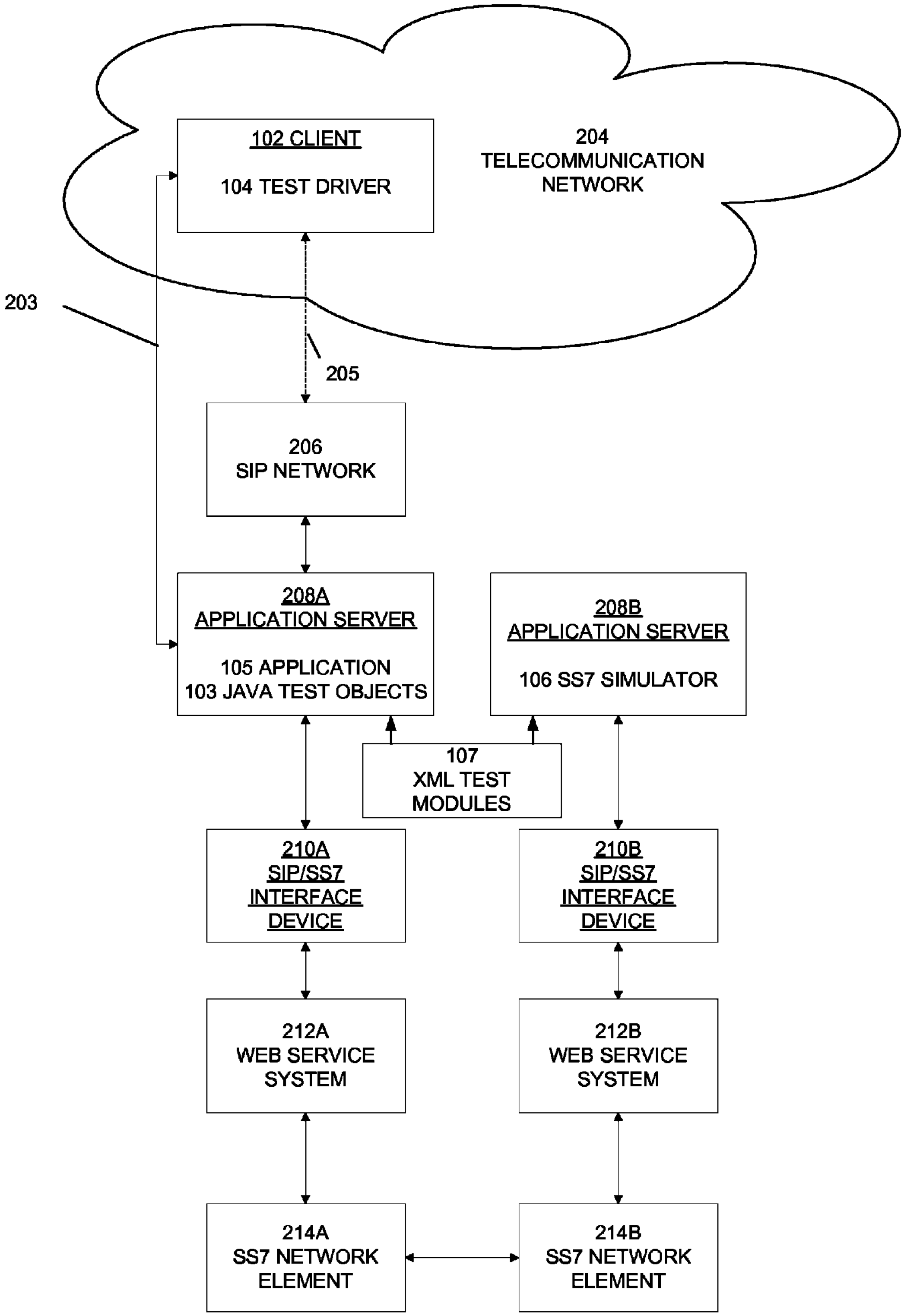
FIG. 1 shows an illustrative network system that can be used to practice aspects of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing More specific examples of the computer readable storage medium comprise for example, a semiconductor or solid state memory, magnetic tape, an electrical connection having one or more wires, a swappable intermediate storage medium such as floppy drive or other removable computer diskette, tape drive, external hard drive, a portable computer diskette, a hard disk, a rigid magnetic disk, a random access memory (RAM), a read-only memory (ROM), an erasable programmable read-only memory (EPROM or Flash memory), a portable compact disc read-only memory (CD-ROM), a read/write (CD-R/W) or digital video disk (DVD), an optical fiber, disk or storage device, or a transmission media such as those supporting the Internet or an intranet. The computer-usable or computer-readable medium may also comprise paper or another suitable medium upon which the program is printed or otherwise encoded, as the program can be captured, for example, via optical scanning of the program on the paper or other medium, then compiled, interpreted, or otherwise processed in a suitable manner, if necessary, and then stored in a computer memory. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wire line, wireless, optical fiber cable, RF, etc.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

According to illustrative embodiments of the present invention, the invention may be implemented in a SIP/SS7 based system. The acronym SS7, as used herein, refers to a set of protocols that describe a means of communication between telephone switches in public telephone networks. Typically, SS7 communication protocols are used to provide signaling and control for various telephone network services and capabilities. For example, SS7 communication protocols can be used to set up telephone calls, tear down telephone calls, translate numbers, enable prepaid billing, and enable short message services. The phrase "Transfer Capabilities Application Part (TCAP)", as used herein, refers to a protocol for SS7 networks. The primary purpose of TCAP is to control non-circuit related information switched between two or more signaling nodes. The phrase "Session Initiation Protocol (SIP)", as used herein, refers to a standard protocol for initiating an interactive user session that involves multimedia elements.

Various aspects of the disclosed embodiment enables flexible and automated end-to-end testing of applications over networks, such as, for example, TCAP and legacy SS7 networks using programmable extensible markup language (XML) test scripts and data tunneling in TCAP messages. FIG. 1 is an illustrative network that is shows two network legs, a leg A on the left side and a leg B on the right side. It should be understood that these are illustrative; many different networks and network configurations can exist, including one in which legs A and B are combined into one leg. Telecommunication network 204 includes a client A (102) that is connected with the A leg. A web services application under test is located at application server 208A. Client 102 is typically connected via a network link 205 to SIP network 206 with application server 208A. In the disclosed embodiment, client 102 is directly connected to application server 208A by a connection 203. Client 102 contains a test driver 104 that initiates the execution of test cases; for this purpose test driver 104 transmits SIP messages to the application 105 at application server 208A. The SIP messages from test driver 104 cause application 105 to initiate test messages to SIP/SS7 interface device 210A using a SOAP protocol. These messages are converted to a TCAP protocol at SIP/SS7 Interface Device 210A; the TCAP messages are thence transmitted via a web service system 212A to SS7 network element 214A. SS7 Network Element 214A transmits the TCAP messages to SS7 Network Element 214B; the test messages continue up leg B to test simulator 106 located in application server 208B where one or more test responses are generated and returned over legs B and A to the application 105 where the results are collected, analyzed and possibly made available to an operator or to test driver 104 for analysis.

Test Driver 104 initiates a test case by sending a test case (TC) number to application server 208A via SIP network 206. Application server 208A uses the TC number to retrieve a test case module from storage 107. A test case module contains instructions in an XML format; the XML instructions direct the application 105 under test to send specific SIP request messages to test simulator 106 that resides at application server 208B. Application servers 208A and 208B might or might not reside in the same physical component. A test module also specifies the expected response to be returned to application 105 responsive to a test message. As shown in FIG. 1, both application 105 and test simulator 106 have access to storage 107 where the XML test files are stored. This allows test simulator 106 to return the expected response to the application 105 under test to determine how the application treats the response.

There may be any number of XML files in a module that are accessed in sequence to provide an overall test. This will become clearer in regard to a series of illustrative message flows shown in FIGS. 2 and 3. Each XML file associated with any test case describes a SOAP message that application 105 will invoke, the expected response from test simulator 106, network parameters to use and the allowable pause and timeout values between these events, etc. A series of related XML test files in a test case are identified by a unique test case number. When a test case is initiated at Client A, the test case number is encoded into the header of a SIP INVITE message. Each subsequent request and response also includes the test case number. Specifically, the test case number is encoded in the ByteArray private data field of the related SOAP message. By encoding the test case number as a private parameter in the ByteArray field, the test case number is tunneled to test simulator 106 without the TCAP/SS7 network interpreting and damaging the test case number. In this way, the test case number reaches test simulator 106 intact for synchronizing the application 105 and the test simulator 106. This is the way that both application 105 and test simulator 106 are synchronized such that each knows what test case is being executed.

Both application 105 and simulator 106 have access to the same or identical XML test case files, which also specifies to test simulator 106 the exact response to return to application 105. If application 105 deals with a response properly, then the application is working properly, at least up to this point in a test case. Otherwise, there is a problem to be solved in the application. It should be understood that other ways of synchronizing application 105 and simulator 106 are possible and within the scope of this disclosure. For example, if both application 105 and simulator 106 are contained within the same physical component, then it is possible for them to communicate directly with shared memory or other interprocess communication techniques to exchange the test case numbers and perhaps the XML test files as well.

Table 1 following is one example of an initial XML test file in a test case.

TABLE 1

Example XML Test Case File

```
 0. <q0:sendRequest xmlns="http://localhost/test.protocol">
 1.       <q0:encodedURI>http://10.50.1.15:9080/testProtocol/TestApplication
</q0:encodedURI>
 2.       <q0:sendReqEvent>
 3.             <q0:opCode>
 4.                <q0:byteArrayString>0110</q0:byteArrayString>
 5.             </q0:opCode>
 6.          <q0:opType>1</q0:opType>
 7.          <q0:opClass>1</q0:opClass>
 8.          <q0:dialogId>XX_DLGID</q0:dialogId>
 9.       </q0:sendReqEvent>
10.   </q0:sendRequest>
```

In response to a test case initiation message from test driver 104, or to a response message from test simulator 106, a control module including a JAXB (JAVA Architecture for XML Binding) compiler (not shown) at application server 208A unmarshalls in real time the next XML file in the test case. Unmarshalling an XML document with the JAXB compiler results in a tree of JAVA objects 103 in which the nodes of the tree correspond to XML elements containing attributes and the content as instance variables. The JAVA application 105 manipulates the JAVA objects 103 to create and send the JAVA test messages according to the instructions in the XML test file and control the receipt and processing of response messages. The integrity and validity of a SOAP service call message is enforced by the name space schemas identified in line 0 of the above example. The test case number is encoded into the byteArrayString defined within the opCode parameters of lines 3-5. The opCode, opType, opClass and dialogID of lines 3 through 8 are parameters that are defined by the TCAP and SS7 protocols.

According to the above arrangement, all of the parameters that might be involved in performing a web service can be made accessible via a series of XML test case files and can be quickly modified to test all combinations of service parameters.

Some of the JAVA test objects 103 are used by the JAVA application 105 to create SOAP service call messages that are sent to simulator 106. Other of the objects 103 are used by the JAVA application to validate the integrity of the SOAP responses from the simulator 106. A service call message consists of a SOAP envelope and a SOAP body. An illustrative SOAP message is shown below. The envelope in lines 1-5 identifies the schemas that define the message. These can contain a protocol specific schema to define message contents and SOAP and XML specific schemas. The SOAP body in lines 6-18 contains the test instructions. The instructions in lines 7 through 17 are identical to the corresponding XML test file that was unmarshalled by JAXB. The opCode, opClass, opType and dialogID parameters in lines 10 through 15 are TCAP and ITU parameters that are well known to workers skilled in the telephony and networking fields. The test case number is encoded in the byteArrayString parameter of line 11.

```
 1. <soapenv:Envelope
 2.       xmlns:q0="http://localhost/test.protocol"
 3.       xmlns:soapenv="http://schemas.xmlsoap.org/soap/envelope/"
 4.       xmlns:xsd="http://www.w3.org/2001/XMLSchema"
 5.       xmlns:xsi="http://www.w3.org/2001/XMLSchema-instance">
 6.   <soapenv:Body>
 7.       <q0:sendRequest>
 8.          <q0:encodedURI>http://10.50.1.15:9080/testProtocol/TestApp
</q0:encodedURI>
 9.          <q0:sendReqEvent>
10.                <q0:opCode>
11.                   <q0:byteArrayString>0110</q0:byteArrayString>
12.                </q0:opCode>
13.             <q0:opType>1</q0:opType>
14.             <q0:opClass>1</q0:opClass>
15.             <q0:dialogId>XX_DLGID</q0:dialogId>
16.          </q0:sendReqEvent>
17.       </q0:sendRequest>
18.          </soapenv:Body>
19. </soapenv:Envelope>
```

The following is an example of tunneling the test case number and the dialogID in a BASE64 byte array;

<parameters>
<byteArrayString>
MTyqC4YHAQAjCghAdHUT30QBzYUJBAAhCxRSFxiB33QBAN9KAxUDB993AQj
fhA8BAgMEBQYHCAkKCwwNDg8=
</byteArrayString>
</parameters>

The HEX version of the BASE64 string above is:

31 3c aa 0b 86 07 01 00 23 0a 08 40 74 75 13 df 44 01 cd 85 09 04 00 21 0b 14 52 17 18 81 df 74 01 00 df 4a 03 15 03 07 df 77 01 08 df840f0102030405060708090a0b0c0d0e0f

The last 18 bytes of the above hex string (shown underlined) is added by a JAVA application 105 to tunnel the test case number and dialogID. The first byte "df" of this underlined portion denotes the beginning of a private data field, followed by the second byte, "84", representing the tag of the private data field. The third byte, "0f", indicates there are 15 remaining bytes in this private field. These 15 remaining bytes are used to encode the test case number and other test session data. The original data from the test case XML file is always preserved. The tunneled data is appended to the existing data. Only the second byte in the overall hex string above is adjusted, as it indicates the total number of the bytes in the byteArrayString.

Figure 2:
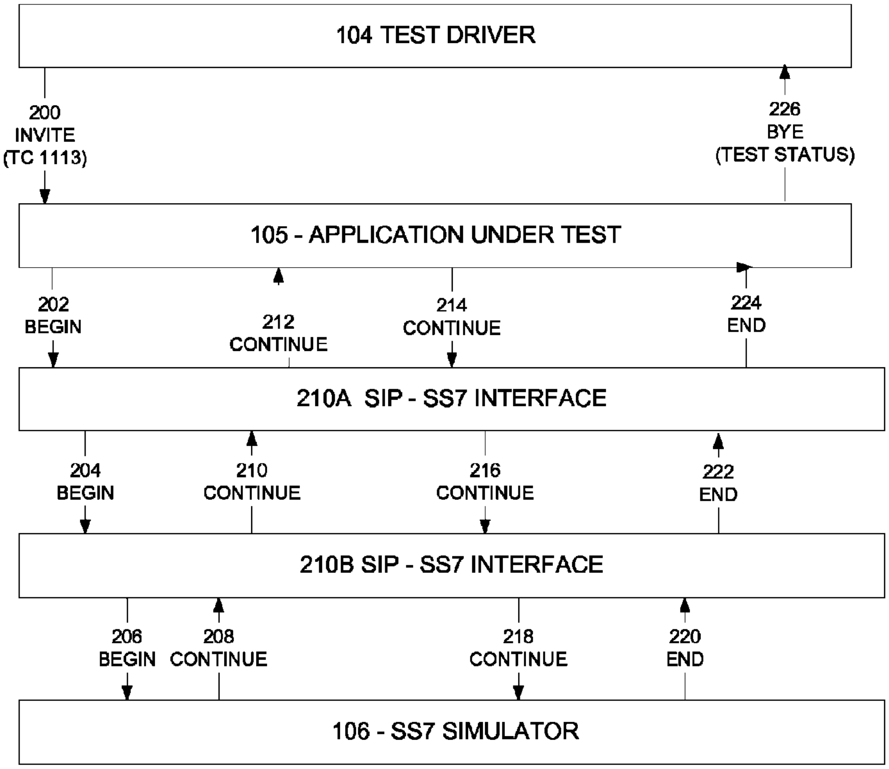
FIGS. 2 and 3 show a series of network message flows that illustrate how an application under test can synchronize test messages with responses returned by a remote response simulator.
Figure 3:
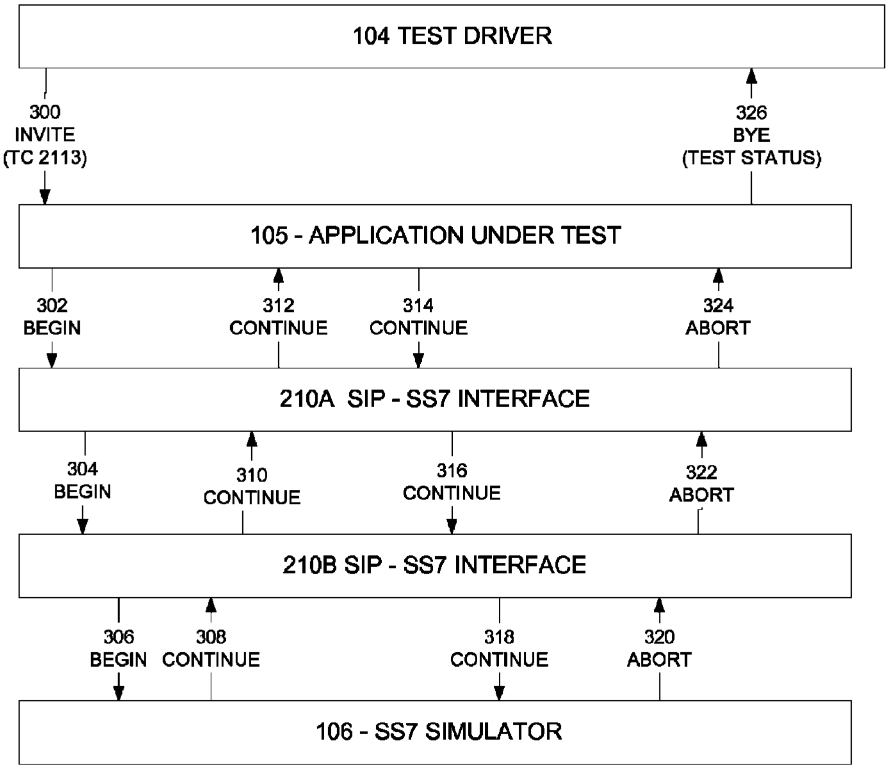

FIGS. 2 and 3 illustrate the message flows in two example test scenarios. The Figs. are simplified by omitting network components that are not necessary for understanding the invention at this point. Reference will also be made to FIGS. 3 through 7, which contain illustrative flowcharts, at appropriate points. FIG. 2 illustrates a normal flow in which a test process should complete successfully with the simulator returning an END message at the close. FIG. 3 illustrates a scenario in which the simulator should return an ABORT response. These simple examples are used to test that application 105 responds properly to the END and ABORT responses, and that the intervening network components correctly transport the data in it's entirety.

Figure 4:
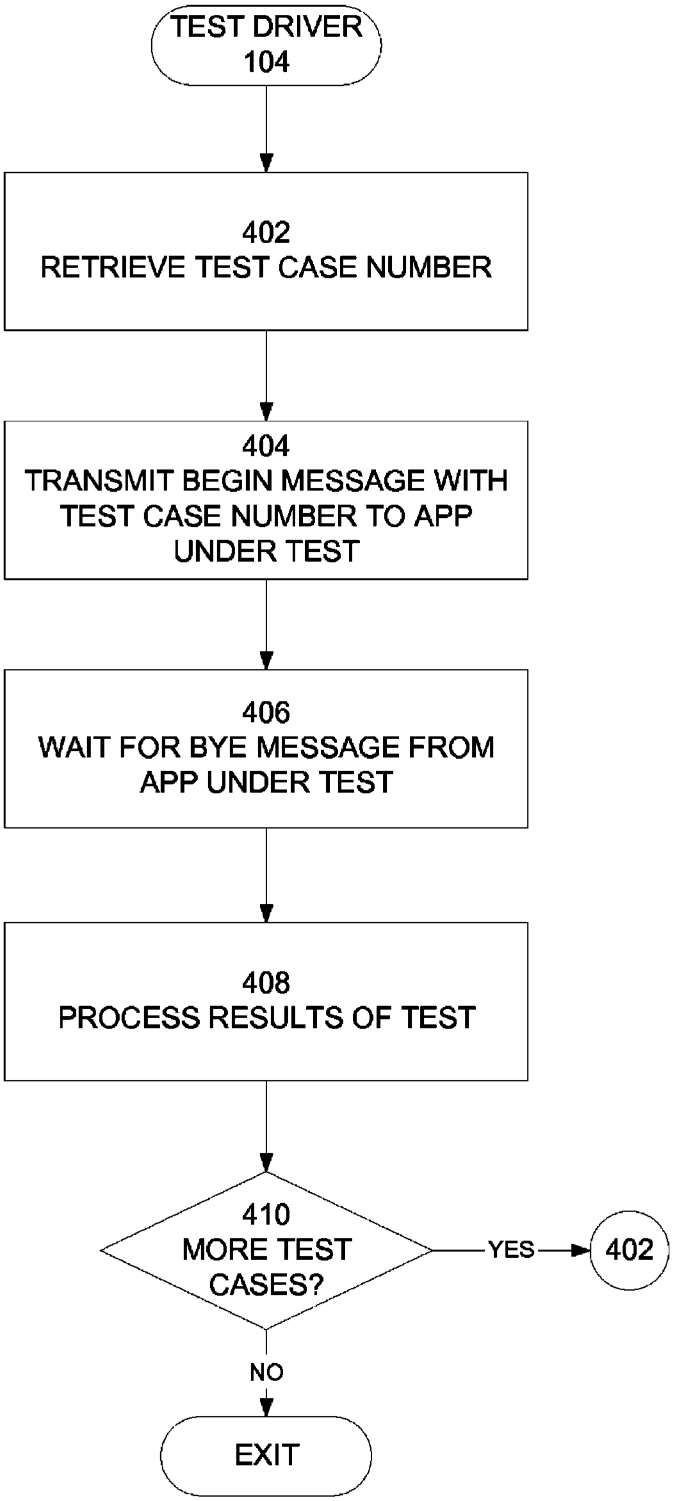
FIGS. 4 through 7 show illustrative flowcharts executed at the application network component and at the response simulator to carry out the testing on an application.
Figure 5:
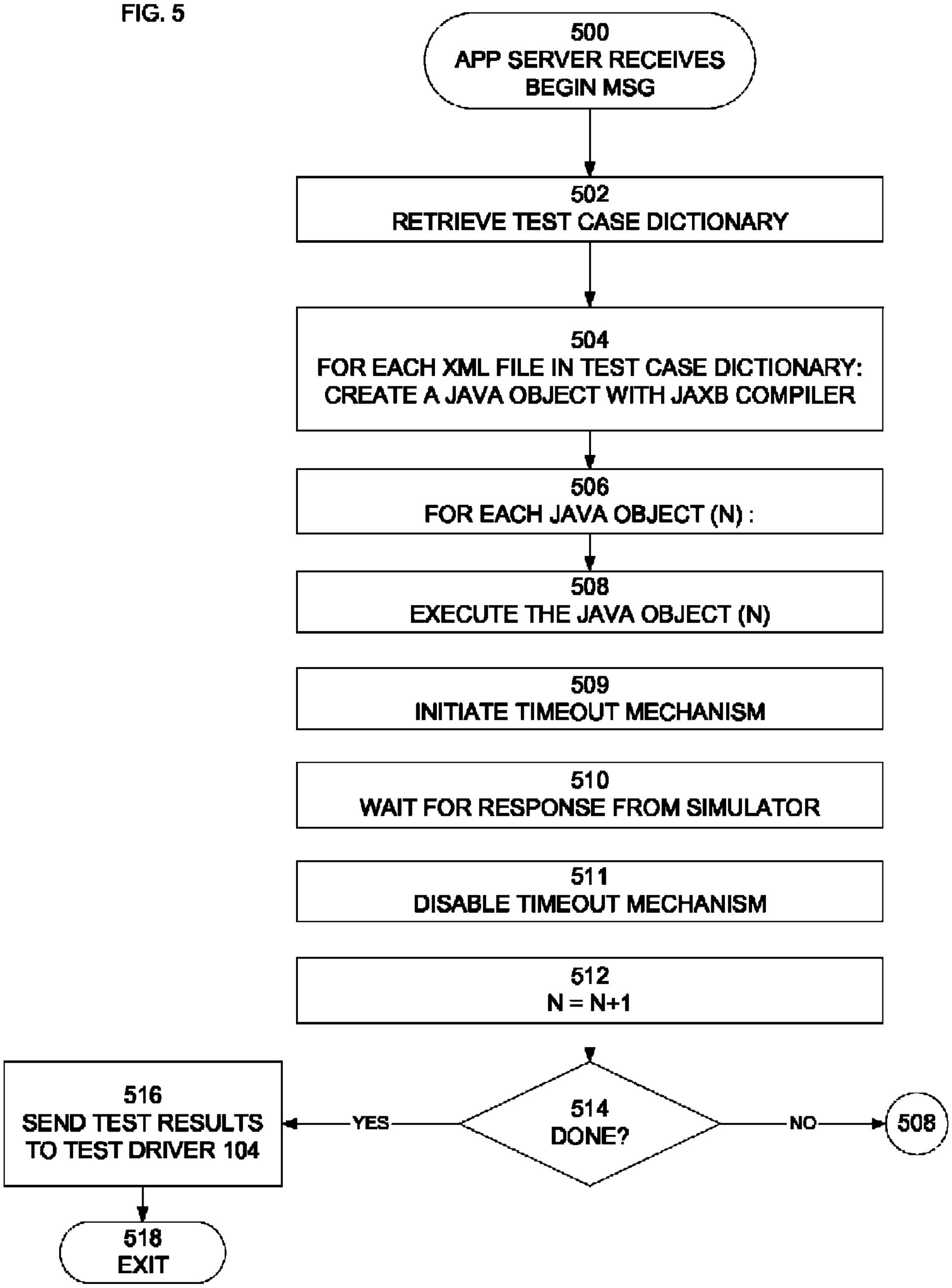

With reference to FIG. 2, test driver 104 initiates a test case illustratively numbered 1113 by transmitting an INVITE message at 200 (see FIG. 4, steps 402, 404). The test case number is included in the message for tunneling to simulator 106. Application server 208A receives the message and initiates the generation of JAVA objects as described earlier. A JAVA object is generated using the JAXB compiler for each message and expected response that application 105 will transmit and receive in the test case (see FIG. 5, step 504). Application server 208A then executes the JAVA application 105 which uses the first JAVA object 103 to convert the INVITE message into a BEGIN message and transmit it at 202 (see FIG. 5, steps 504, 508). Application 104 then initiates a timeout mechanism at step 509 for receiving a response from simulator 106. The BEGIN message continues through the network at 204 and 206 to SS7 simulator 106. Simulator 106 retrieves the test case number from the BEGIN message (FIG. 7, step 702) and retrieves the first XML test file corresponding with the BEGIN message from storage 107 (FIG. 7, step 704) to determine the response. In this example, the XML file specifies that simulator 106 return a CONTINUE message, which is shown at 208 and steps 706 and 708 of FIG. 7. This message continues at 210 and 212 to application 105. When the response is received by application 105 within the timeout period, step 511 disables the timeout mechanism. The execution of sending the data associated with the second JAVA object corresponding with this test case number is also activated. The JAVA application 105 reads the second XML test file from the test module corresponding to the test case number, which specifies that the application 105 proceed with a second CONTINUE message at 214 to simulator 106. When simulator 106 receives this message at 218, it reads the second XML test file, which specifies what the received SOAP message should look like. The simulator 106 then returns an END message to the application 105. This occurs at 220, 222 and 224, which causes a second JAVA object at application server 105 to be processed which controls the application to process the END message. Application 105 processes the END message and upon determining that there are no more XML files to process, it initiates a BYE message and sends any test results in the BYE message to test driver 104 at 226 (FIG. 4, steps 406, 408, and 410.

Figure 6:
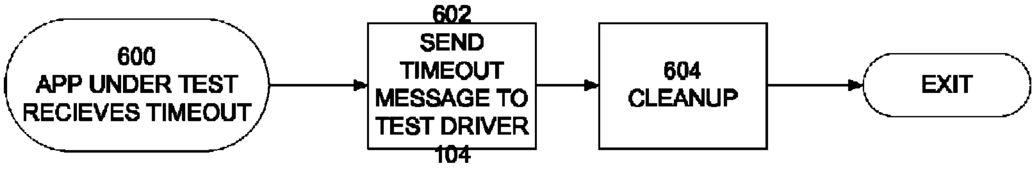
Figure 7:
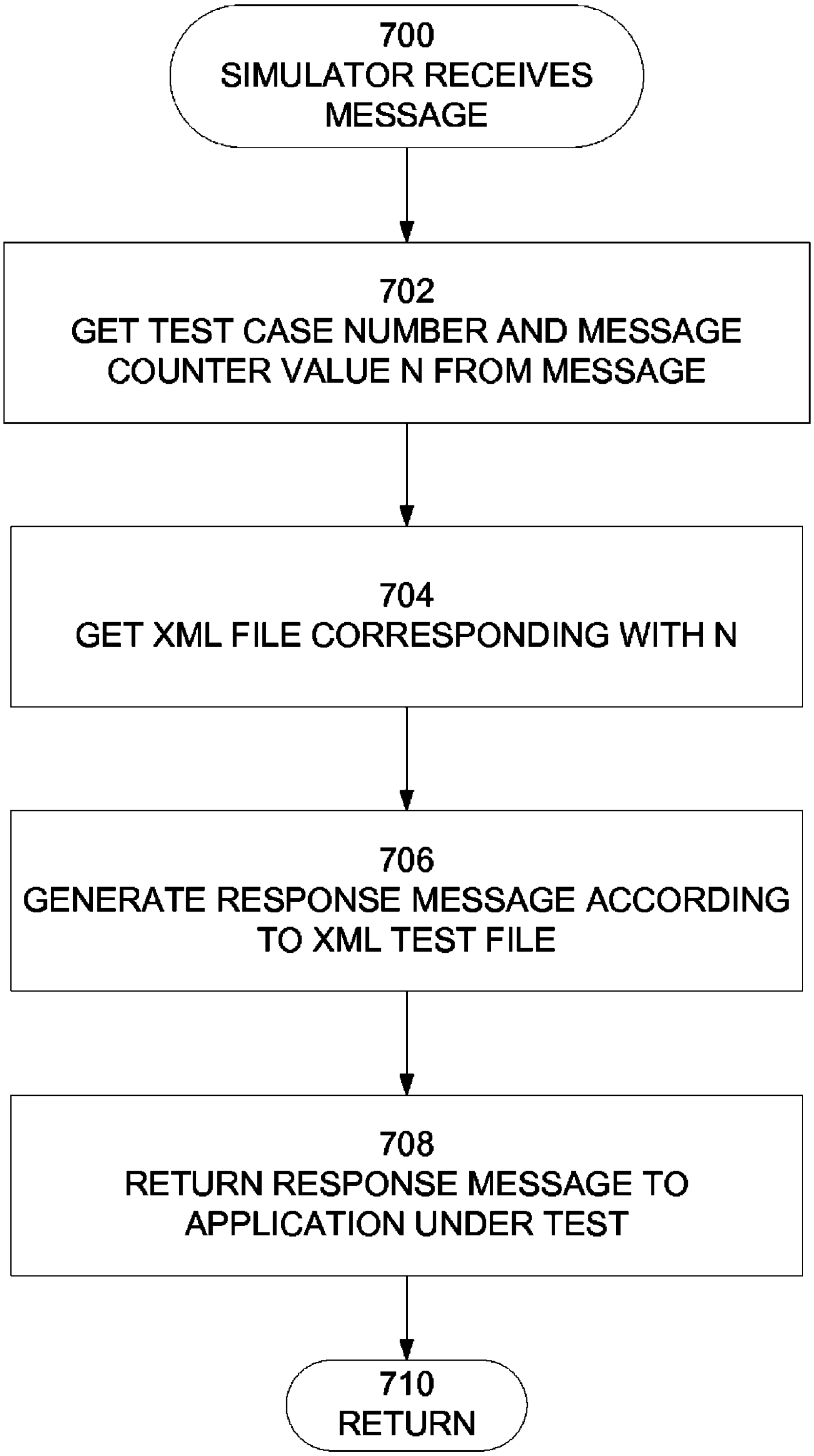

FIG. 6 illustrates how test driver 104 is activated should application server 208A or application 105 fail to execute a test case, due to a crash for example. If a timeout established at FIG. 5, step 509 occurs, application server 208A causes an entry to 600, where step 602 sends a timeout message to test driver 104. Step 604 then cleans up the test environment and exits.

Having thus described the invention of the present application in detail and by reference to embodiments thereof, it will be apparent that modifications and variations are possible without departing from the scope of the invention defined in the appended claims.

We claim:

1. A method executed by a computer for enabling end-to-end testing of network applications, comprising controlling an application under test connected at one end of a network to transmit a test message in a test module to a response simulator at the other end of the network, receiving a response message from the simulator to the test message, wherein the response is dictated by a module identical to the test module, and comparing the response message to an expected response message contained in the test module.

2. The method of claim 1 wherein the test module is identified by a test module identifier, and the method further comprises transmitting the identifier to the simulator in a private data portion of a transmitted test message.

3. The method of claim 1 wherein the test module further comprises a test file containing a test message, an expected response, and the values of network parameters that control the transmission of messages.

4. The method of claim 1 wherein the test module further comprises a timeout value associated with the test message, specifying a time interval during which a corresponding response message should be received.

5. The method of claim 1 in which the test module is written in a tag-formatted language.

6. The method of claim 1 in which the test module is written in extensible markup language (XML).

7. A computer program product comprising:

a computer readable storage medium having computer readable program code embodied therewith, the computer readable program code comprising:

computer readable program code configured to control an application under test connected at one end of a network to transmit a test message in a test module to a response simulator at the other end of the network;

computer readable program code configured to receive a response message from the simulator to the test message, wherein the response is dictated by a module identical to the test module, and computer readable program code configured to compare the response to an expected response contained in the test module.

8. The computer program product of claim 7 wherein the test module is identified by a test module identifier, and the computer program product further comprises computer readable program code configured to transmit the identifier to the simulator in a private data portion of a transmitted test message.

9. The computer program product of claim 7 wherein the test module further comprises a test file containing a test message, an expected response, and the values of network parameters that control the transmission of messages.

10. The computer program product of claim 7 wherein the test module further comprises a timeout value associated with the test message and specifying a time interval during which a corresponding response message should be received.

11. The computer program product of claim 7 in which the test module is written in a tag-formatted language.

12. The computer program product of claim 7 in which the test module is written in extensible markup language (XML).

* * * * *